(12) United States Patent
Fujino et al.

(10) Patent No.: US 9,349,337 B2
(45) Date of Patent: May 24, 2016

(54) DISPLAY DEVICE

(71) Applicant: MITSUBISHI ELECTRIC CORPORATION, Tokyo (JP)

(72) Inventors: Toshiaki Fujino, Tokyo (JP); Yasunori Niwano, Tokyo (JP); Syuichi Kira, Tokyo (JP); Shingo Nagano, Tokyo (JP); Akimasa Yuuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 48 days.

(21) Appl. No.: 14/103,720

(22) Filed: Dec. 11, 2013

(65) Prior Publication Data

US 2014/0184660 A1  Jul. 3, 2014

(30) Foreign Application Priority Data

Dec. 27, 2012  (JP) ................. 2012-284588

(51) Int. Cl.
G09G 5/10 (2006.01)
G09G 3/36 (2006.01)
H04N 13/04 (2006.01)
G09G 3/00 (2006.01)

(52) U.S. Cl.
CPC ......... *G09G 3/3655* (2013.01); *H04N 13/0409* (2013.01); *G09G 3/003* (2013.01); *G09G 2300/0426* (2013.01); *G09G 2300/0434* (2013.01); *G09G 2310/0232* (2013.01)

(58) Field of Classification Search
USPC .................. 345/690, 103, 102, 87
See application file for complete search history.

(56) References Cited

U.S. PATENT DOCUMENTS

2012/0113379 A1*  5/2012  Tomizawa ............ G09G 3/3607
349/187

FOREIGN PATENT DOCUMENTS

JP  04-145416 A  5/1992
JP  2857429 B2  2/1999

* cited by examiner

*Primary Examiner* — Joseph Haley
*Assistant Examiner* — Ifedayo Iluyomade
(74) *Attorney, Agent, or Firm* — Studebaker & Brackett PC

(57) ABSTRACT

A one-pixel structure of a display panel included in an autostereoscopic image display device adopts an in-plane switching mode. Transparent counter electrodes that are not provided in a liquid crystal panel of a normal in-plane switching mode are formed correspondingly to pixel peripheral regions on a second transparent substrate side and, in 3-dimensional image display, a vertical electric field is forcibly generated between the transparent counter electrodes and the combshaped electrodes, which causes the liquid crystal molecules to rise to show black display in the pixel peripheral regions. In 2-dimensional image display, meanwhile, the transparent counter electrodes are set to be floating, and the display panel is caused to have a structure substantially equivalent to a structure in which the transparent counter electrodes are not provided, to thereby make the display in pixel peripheral regions identical to the display (brightness) in a pixel main region.

2 Claims, 6 Drawing Sheets

F I G . 2 A
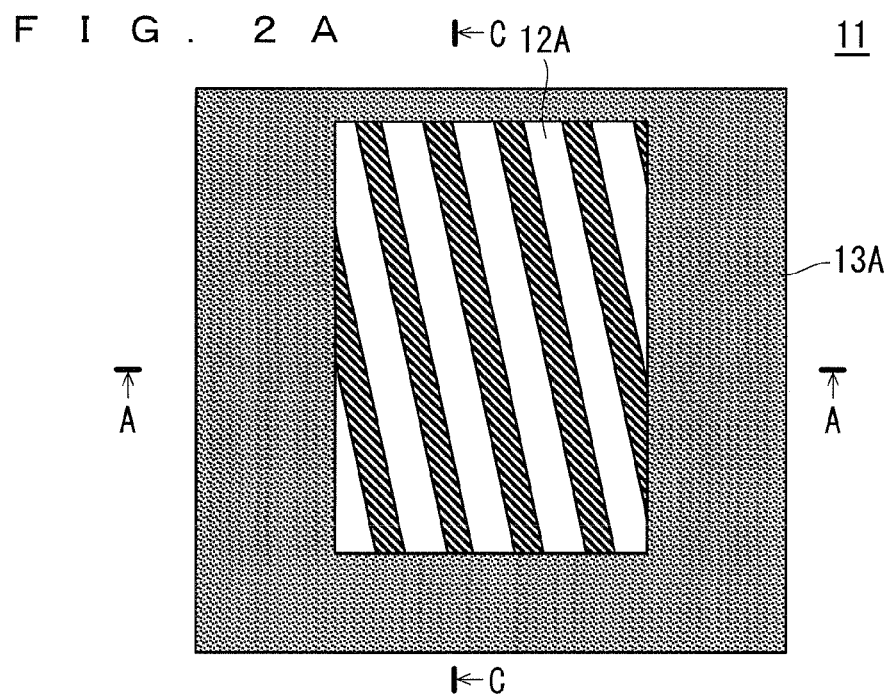
F I G . 2 B
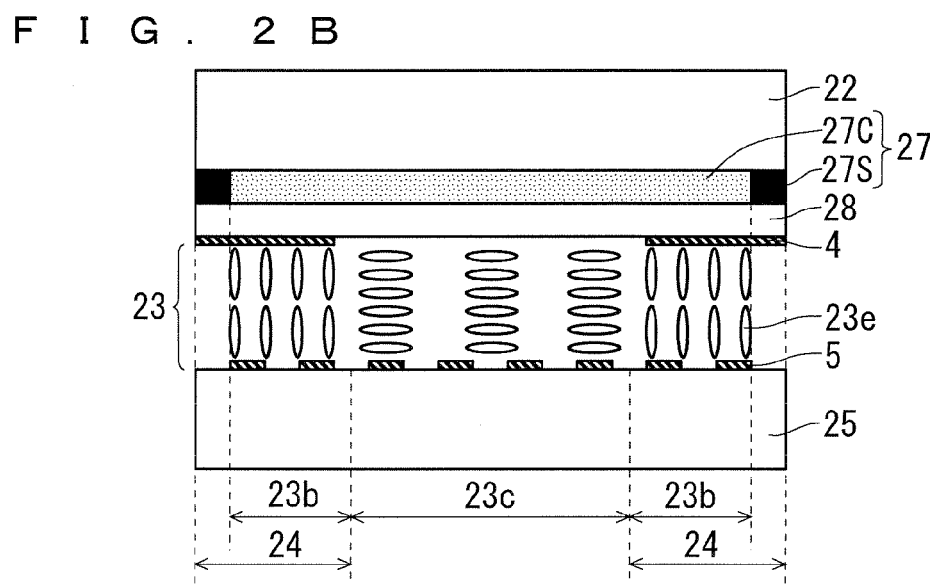

F I G . 4
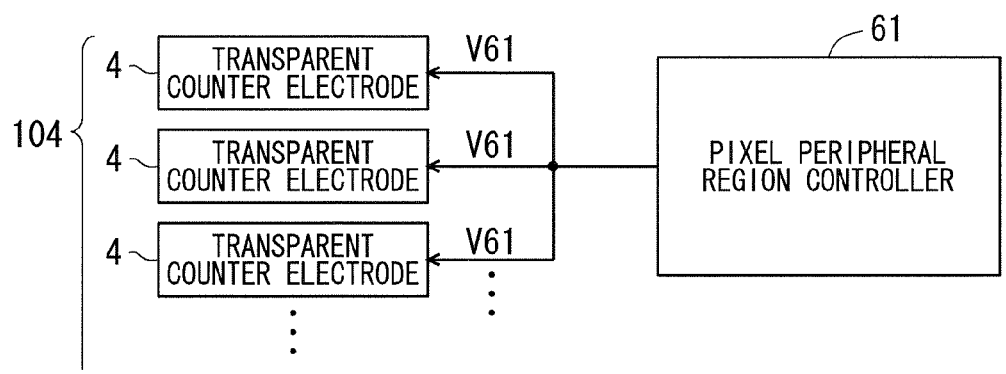

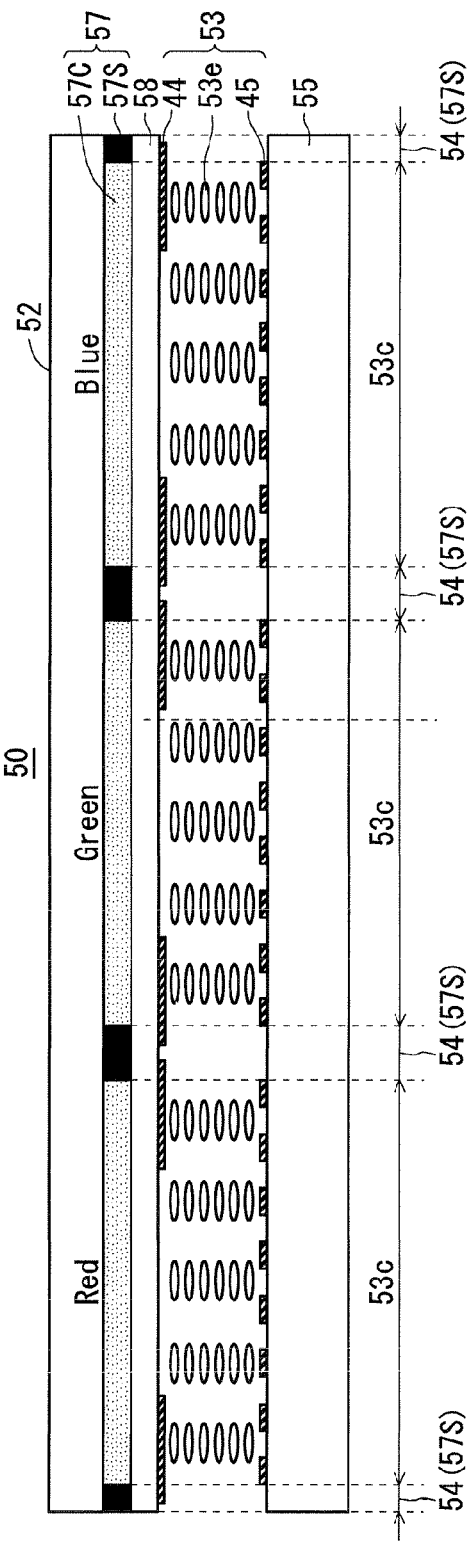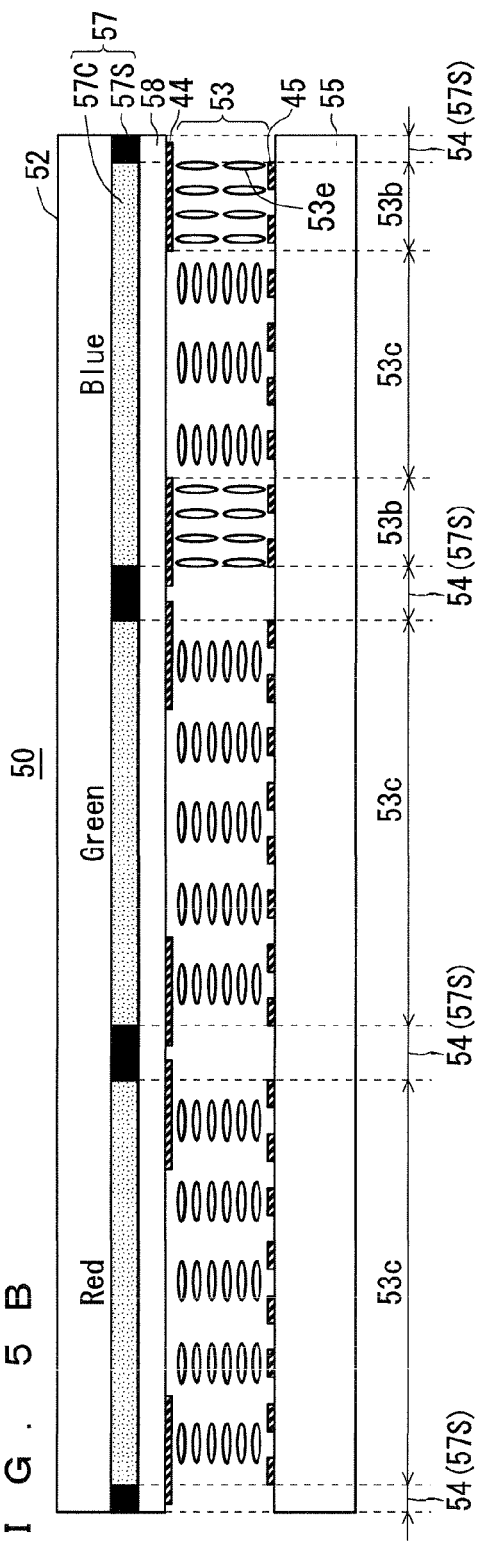

F I G. 6
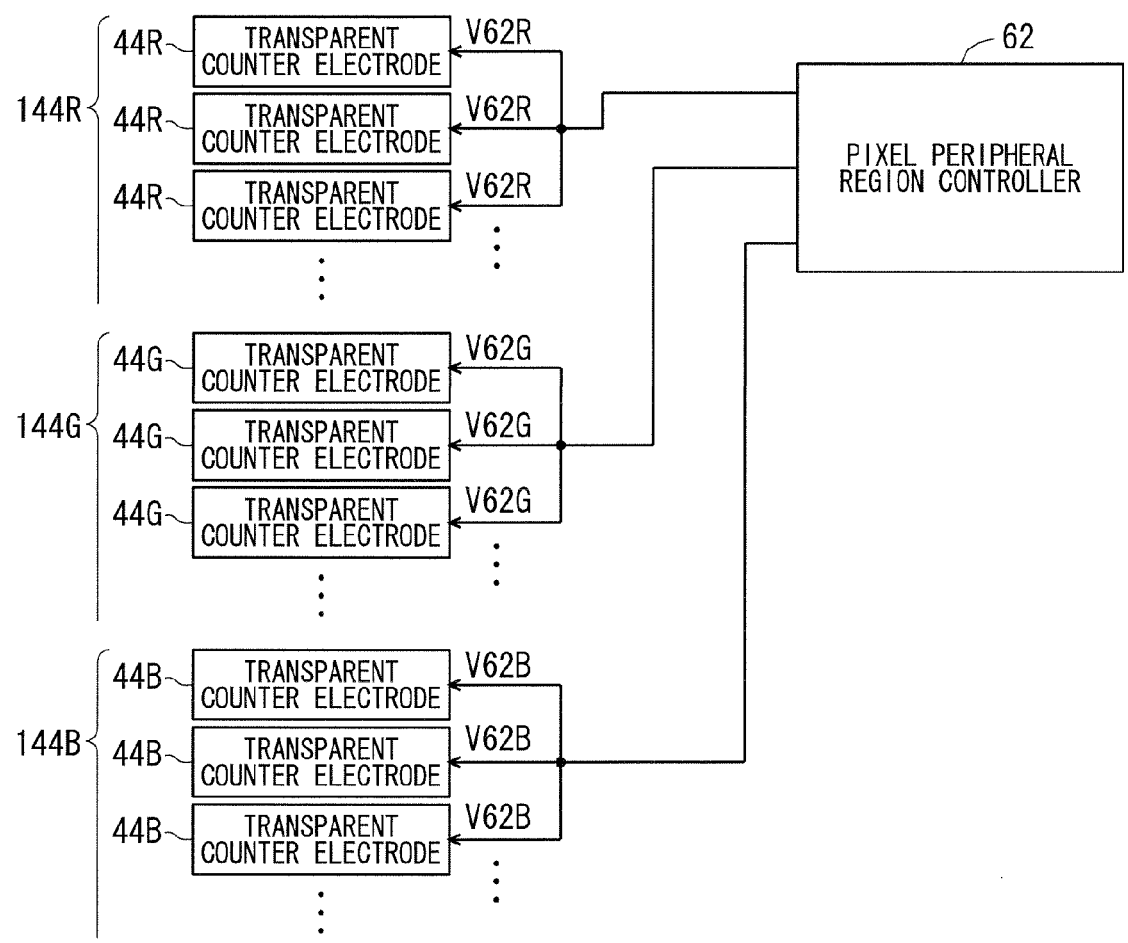

DISPLAY DEVICE

BACKGROUND OF THE INVENTION

1. Field of the Invention

The present invention relates to display devices such as a liquid crystal display device including a liquid crystal display panel, and more particularly, to the brightness adjustment technology in image display.

2. Description of the Background Art

Nowadays, an auto-stereoscopic image display device capable of stereoscopic viewing without special glasses is proposed. For example, Japanese Patent No. 2857429 discloses a 3-dimensional image display device including a barrier generating unit and an image display unit. The barrier generating unit generates parallax barrier stripes through electronic control by a transmissive display element. The image display unit includes a display screen disposed behind a position at which parallax barrier stripes are generated with a predetermined distance therefrom and, in display of a 3-dimensional image, is capable of outputting and displaying on the display screen a multidirectional image containing stripes for the left image and right image alternately arranged correspondingly to the parallax barrier stripes.

In the 3-dimensional image display device as described above, parallax barrier stripes are generated electronically, and the shape (the number, width, and interval of stripes), position (phase), concentration, and the like of the parallax barrier stripes generated can be variably controlled at will. This enables the above-mentioned 3-dimensional image display device to be used as a 2-dimensional image display device, a 3-dimensional image display device, and display methods using them, realizing a compatible image display device and an image display method using the device.

In the two-image display device (3-dimensional image display device) including a parallax barrier, the lateral (horizontal) pixel aperture width is made smaller with a black matrix (light shielding film) compared with an image display device that displays only a single image. This prevents both lights of two images reaching the left and right eyes from existing, allowing an observer to recognize stereoscopic vision with little crosstalk.

Japanese Patent Application Laid-Open No. 04-145416 (1992) discloses a liquid crystal display device including multiple pixels segmented for RGB basic colors, in which the area ratio or distribution ratio of the pixels to be respectively distributed for the basic colors is changed. The liquid crystal display device described above is configured to easily correct the imbalance in display colors.

In the display device that employs the configuration in which the lateral pixel aperture width is narrowed with a black matrix (light shielding film) and that includes a display panel capable of switching between single image display and two-image display for three dimensions, unfortunately, the pixel aperture width is kept narrow also in a case of normal single image display. This results in a lower transmittance of the display panel than that of an image display device that displays only a single image, which decreases brightness.

In the liquid crystal display device as described in Japanese Patent Application Laid-Open No. 04-145416 (1992), the imbalance in display colors can be corrected by changing the area ratio or distribution ratio of the pixels in the initial design stage of a panel. However, the imbalance in display colors cannot be corrected after manufacturing of the panel and, for example, color adjustment of correcting the imbalance in display colors due to variations in a manufacturing process cannot be performed.

SUMMARY OF THE INVENTION

The present invention has an object to obtain a display device capable of variable control of brightness or color adjustment of display colors after a device is completed.

A display device according to the present invention includes a display panel and a pixel-peripheral-region brightness control unit. The display panel performs image display with multiple pixels arranged in matrix, and the pixel-peripheral-region brightness control unit controls the brightness of pixel peripheral regions being peripheral portions of each of the multiple pixels, independently of a pixel main region other than the pixel peripheral regions.

According to the display device of the present invention, the brightness of the pixel peripheral regions of multiple pixels can be variably controlled in accordance with a display mode by the pixel-peripheral-region brightness control unit after the device is completed.

These and other objects, features, aspects, and advantages of the present invention will become more apparent from the following detailed description of the present invention when taken in conjunction with the accompanying drawings.

BRIEF DESCRIPTION OF THE DRAWINGS

FIGS. 2A and 2B are explanatory views schematically showing a one-pixel structure of a display panel displaying a 3-dimensional image in the first preferred embodiment;

FIG. 4 is an explanatory view schematically showing the contents of voltage control for multiple transparent counter electrodes by a pixel peripheral region controller in the first preferred embodiment;

FIGS. 5A and 5B are cross-sectional views showing a configuration of a display panel of a display device according to a second preferred embodiment of the present invention; and FIG. 6 is an explanatory view schematically showing the contents of voltage control for multiple transparent counter electrodes by a pixel peripheral region controller in the second preferred embodiment.

DESCRIPTION OF THE PREFERRED EMBODIMENTS

First Preferred Embodiment

Figure 1:
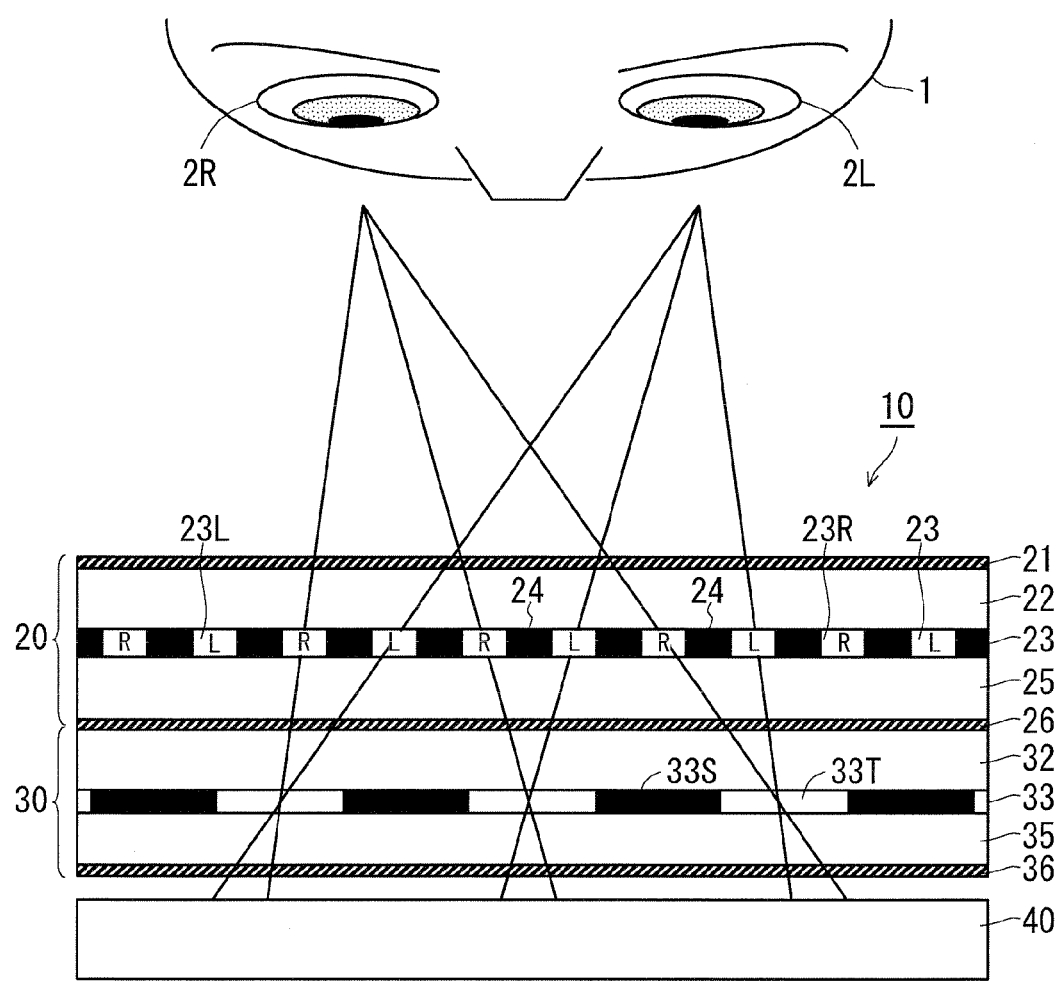
FIG. 1 is a cross-sectional view showing a configuration of an auto-stereoscopic image display device according to a first preferred embodiment of the present invention.

Principles of Invention: Outline of Structure of Liquid Crystal Parallax Barrier System Auto-Stereoscopic Display FIG. 1 is a cross-sectional view showing a configuration of a display device (auto-stereoscopic display device of the liquid crystal parallax barrier system) according to a first preferred embodiment of the present invention. An auto-stereoscopic image display device 10 is capable of simultaneously displaying two images (3-dimensional image) composed of a right image (parallax image for right eye (image for first observation direction; type 1 image)) and a left image (parallax image for left eye that slightly differs from the parallax image for right eye (image for second observation direction; type 2 image)).

The auto-stereoscopic image display device 10 allows visual recognition of a stereoscopic image with naked eyes without the use of special glasses or allows display of images different from one observation direction to another. A case in which the auto-stereoscopic image display device 10 displays parallax images for the right eye and left eye is mainly described below. For the sake of description, the up-down direction, left-right direction, and depth direction in FIG. 1 are hereinbelow referred to as a front-back direction, lateral direction (horizontal direction), and longitudinal direction (vertical direction), respectively.

FIG. 1 shows a cross-sectional structure of the auto-stereoscopic image display device 10 (auto-stereoscopic display). As shown in FIG. 1, the auto-stereoscopic image display device 10 includes a (liquid crystal) display panel 20 and a parallax barrier panel 30 arranged behind the display panel 20 (in a lower side of FIG. 1).

The display panel 20 is a matrix type display panel that displays images with multiple pixels arranged in matrix, and FIG. 1 shows the display panel 20 (liquid crystal display panel) to which a liquid crystal display is applied. The display panel 20 mainly includes a liquid crystal layer 23 in which liquid crystals are formed, transparent substrates 22 and 25 opposed to each other with the liquid crystal layer 23 sandwiched therebetween, and an upper polarizing plate 21 and an intermediate polarizing plate 26 respectively provided to the transparent substrates 22 and 25 on the sides opposite to the liquid crystal layer 23. An electrode for driving liquid crystals of the display panel 20 is not shown in FIG. 1.

In the liquid crystal layer 23 of the display panel 20, sub-pixel regions for right eye 23R (regions for type 1 image) in which an image for a right eye 2R of an observer 1 is displayed and sub-pixel regions for left eye 23L (regions for type 2 image) in which an image for a left eye 2L of the observer 1 is displayed are alternately arranged in the lateral direction (horizontal direction), each of which being sandwiched between light shielding portions 24.

The sub-pixel region for right eye 23R and sub-pixel region for left eye 23L are set to have the same or approximately the same horizontal width. The sub-pixel regions for right eye 23R and sub-pixel regions for left eye 23L configured as described above are laterally arranged at predetermined regular pitches in the display panel 20. In the first preferred embodiment, the sub-pixel regions for right eye 23R and sub-pixel regions for left eye 23L are arranged not only laterally but also longitudinally.

The parallax barrier panel 30 includes two transparent substrates 32 and 35, a liquid crystal layer 33 sandwiched and held between the transparent substrates 32 and 35, and a lower polarizing plate 36 provided to the transparent substrate 35 on the side opposite to the liquid crystal layer 33. The intermediate polarizing plate 26 of the display panel 20 also functions as the polarizing plate between the parallax barrier panel 30 and the display panel 20. An electrode for driving liquid crystals of the parallax barrier panel 30 and the like are not shown in FIG. 1 for the sake of description.

Multiple stripe transparent electrodes extending in the longitudinal direction (depth direction in FIG. 1) are formed on the surface on the liquid crystal layer 33 side of one of the transparent substrates 32 and 35 of the parallax barrier panel 30, and a (solid) transparent counter electrode is formed entirely on the surface on the liquid crystal layer 33 side of the other transparent substrate. The transparent electrodes and the like formed on the transparent substrates 32 and 35 apply an electric field to the liquid crystal layer 33, so that the liquid crystal molecules of the liquid crystal layer 33 are driven.

The twisted nematic (TN) mode is employed as a liquid crystal mode of the parallax barrier panel 30 in the first preferred embodiment. Upon selective application of voltage between the stripe transparent electrodes and the transparent counter electrode, only a voltage applied region is shielded from the light, where parallax barrier stripes (partially light shielded state where shielded regions 33S and transmission regions 33T both exist) required for two-image display (display of 3-dimensional image (second format image)) can be formed. No voltage is applied to all the stripe transparent electrodes and the transparent counter electrode, which enables the entire parallax barrier panel 30 to enter a transmission state (complete light transmitting state) to display a single image (2-dimensional image; first format image).

(Reason for Reducing Lateral Pixel Aperture Ratio of Display Panel 20)

In the display panel 20 of FIG. 1, in display of two images (3-dimensional image), a lateral pixel aperture width is made smaller than that of the display panel displaying only a single image (2-dimensional image). The lateral pixel aperture width is about 70 to 90% of the pixel pitch (distance between the center position of the sub-pixel region for right eye 23R and the center position of the sub-pixel region for left eye 23L) in the display panel displaying only a single image. On the other hand, the lateral pixel aperture width is about 50% of the pixel pitch in the display panel 20 displaying two images, such as the auto-stereoscopic image display device 10.

For example, in a case where the lateral aperture ratio of the parallax barrier panel 30 is 50% in the auto-stereoscopic image display device 10, the lateral pixel aperture width of the display panel 20 that exceeds 50% of the pixel pitch causes a region in which the lights of two images reaching the left and right eyes both exist, which degrades the display characteristics of a 3-dimensional image. In order to avoid both the lights of two images reaching the left and right eyes from existing in such a case, the aperture width of the parallax barrier needs to be set below 50%. Meanwhile, the light transmittance decreases as the aperture width of the parallax barrier becomes smaller, whereby a dark image with low brightness is displayed. This degrades a display image.

From the reason above, the lateral pixel aperture width of the display panel 20 needs to be set small around 50% of the pixel pitch. In a case where the pixel aperture width is reduced with a black matrix (light shielding film), however, the light is shielded unnecessarily when a 2-dimensinoal image is displayed with the entire parallax barrier panel 30 being transmissive, which lowers brightness, degrading the display characteristics. In this case, the brightness of the backlight needs to be increased because the light use efficiency is poor, resulting in an increase in power consumption.

Structure and Effects of this Preferred Embodiment

Next, the pixel of the display panel 20 having the structure characteristic of the auto-stereoscopic image display device 10 according to the first preferred embodiment is described.

Figure 3A:
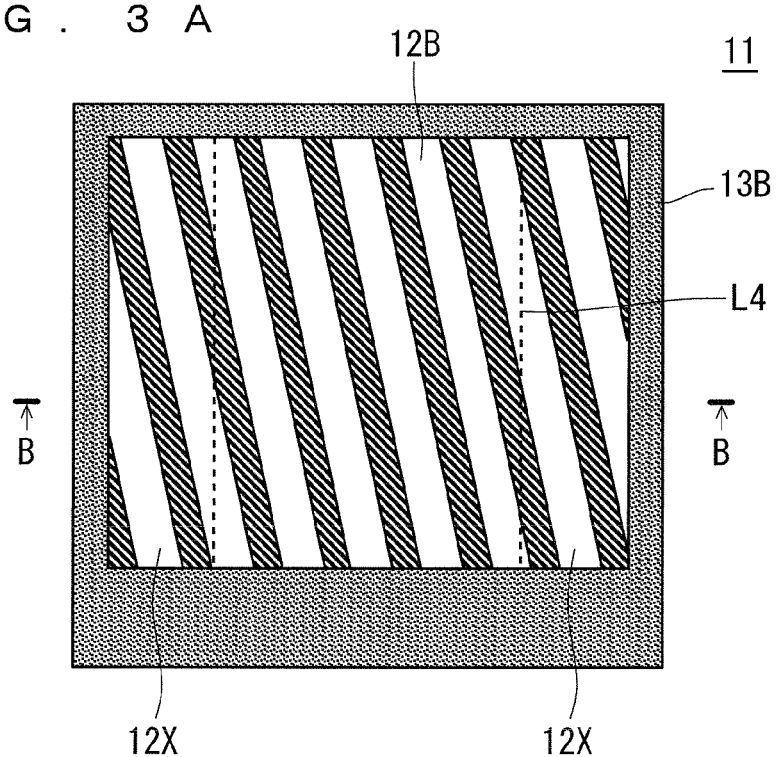
FIGS. 3A and 3B are explanatory views schematically showing a one-pixel structure of the display panel displaying a 2-dimensional image in the first preferred embodiment.
Figure 3B:
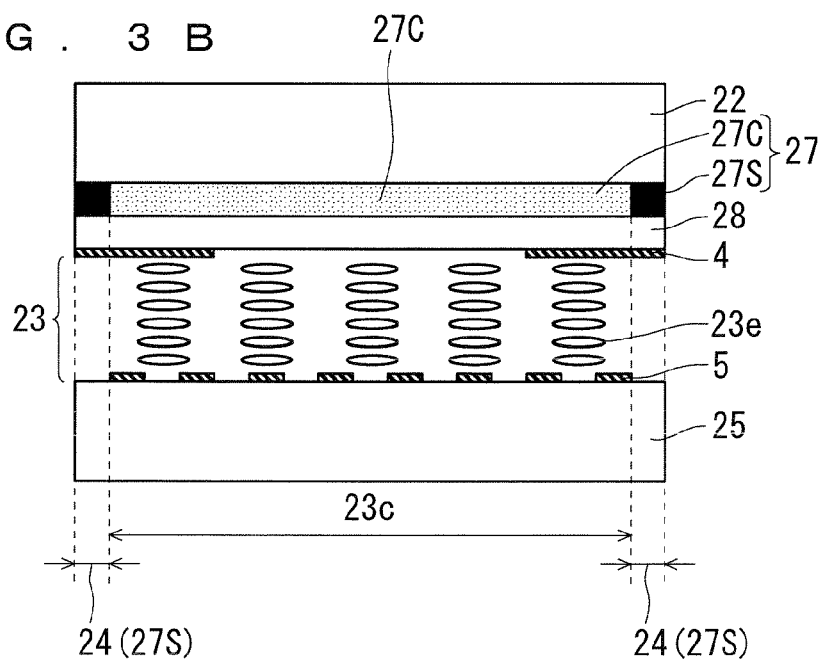

FIGS. 2A and 2B are explanatory views schematically showing a structure of one pixel of the display panel 20 showing a 3-dimensional image (two images; second format image) in the first preferred embodiment. FIGS. 3A and 3B are explanatory views schematically showing the structure of one pixel of the display panel 20 displaying a 2-dimensional image (single image; first format image) in the first preferred embodiment. FIG. 2A is a plan view and FIG. 2B is a cross-sectional view showing a cross-sectional structure taken along A-A of FIG. 2A. FIG. 3A is a plan view, and FIG. 3B is a cross-sectional view showing a cross-sectional structure taken along B-B of FIG. 3A.

Here, an in-plane switching mode is used as a liquid crystal display mode. In the in-plane switching mode, a lateral electric field is generated between a pixel electrode being a first electrode and a common electrode being a second electrode among multiple comb-shaped electrodes 5 formed on one substrate (transparent substrate 25 on the lower side of FIGS. 2A and 2B), and liquid crystal molecules 23e are rotated in a plane, to thereby control light transmittance.

As a structure characteristic of this preferred embodiment, transparent counter electrodes 4 that are not provided in a liquid crystal panel of a normal in-plane switching mode are formed correspondingly to pixel peripheral regions being both-end regions in the horizontal direction (lateral direction) on the upper transparent substrate 22 side. In the configuration shown in FIGS. 2A and 2B and FIGS. 3A and 3B, the transparent counter electrodes 4 are formed below the transparent substrate 22 via a color filter layer 27 (a light-shielding film 27S and a color material film 27C) and an overcoat film 28.

FIG. 4 is an explanatory view schematically showing the contents of voltage control for multiple transparent counter electrodes 4 when a pixel peripheral region controller 61 performs a brightness setting process.

As shown in FIG. 4, the pixel peripheral region controller 61 sets the voltage state of a transparent counter electrode group 104 by supplying a control voltage V61 set as a black display voltage VA in common to multiple transparent counter electrodes 4 forming the transparent counter electrode group 104 or by causing the multiple transparent counter electrodes 4 to be floating without supplying the control voltage V61, to thereby perform the brightness setting process. The multiple transparent counter electrodes 4 correspond to multiple pixels and are provided independently of each other so as to control the liquid crystal molecules 23e in the pixel peripheral regions of the corresponding pixels.

The pixel peripheral region controller 61 supplies the transparent counter electrode group 104 with the control voltage V61 set as the black display voltage VA during the display of a 3-dimensional image (second format image), that is, while the parallax barrier panel 30 is partially shielded from the light. In consideration of a voltage setting state (positive polarity or negative polarity) of the comb-shaped electrode 5 during white display (in a case where a drive potential difference is maximized and black display is least likely to appear), the black display voltage VA is set to a voltage value at which an electric field, which is capable of setting the light shielded state in which the liquid crystal molecules 23e located below the transparent counter electrodes 4 rise, is generated. The timing at which the positive polarity or negative polarity is achieved may be controlled such that the control voltage V61, which is a drive signal for supplying the black display voltage VA to the transparent counter electrode group 104, is switched and varied in synchronization with the polarity switching of a drive signal having a voltage to be applied to the comb-shaped electrodes 5 for display.

As an example, the black display voltage VA is set as follows. In a case where the pixel voltage of the pixel electrode and the common electrode voltage of the common electrode among the comb-shaped electrodes 5 formed on the transparent substrate 25 are represented by VB and VC (VC is fixed at 5 V), respectively, the black display voltage VA is variably set as follows, so that black display constantly (generally) appears in the pixel peripheral regions.

In white display, the pixel electrode voltage VB of the comb-shaped electrode 5 (pixel electrode) is set to 10 V during positive polarity (a potential difference between VB and VC is +5 V). In this case, the black display voltage VA is set to 0 V, and a potential difference of 10 V is provided between the transparent counter electrode 4 and the comb-shaped electrode 5 (pixel electrode).

In white display, the pixel electrode voltage VB is set to 0 V during negative polarity (a potential difference between VB and VC is −5 V). In this case, the black display voltage VA is set to 10 V and, similarly to the positive polarity, a potential difference of 10 V is provided between the transparent counter electrode 4 and the comb-shaped electrodes 5 (pixel electrode).

As described above, the black display voltage VA is varied above or below the common electrode voltage VC being a reference value in accordance with the polarity (10 V (positive polarity) to 0 V (negative polarity)) of the pixel electrode voltage VB in white display, whereby the pixel peripheral regions can be always set to black display.

As a result, as shown in FIG. 2, in 3-dimensional image display, a vertical electric field is forced to occur between the transparent counter electrode 4 of the upper transparent substrate 22 and the comb-shaped electrodes 5 of the lower transparent substrate 25, so that the liquid crystal molecules 23e are caused to respond for rising. This allows black display to appear in the pixel peripheral regions. As shown in FIG. 2A, therefore, a relatively large black display region 13A is formed around an image display region 12A in a display pixel screen 11, resulting in a decrease in brightness on a pixel basis.

On this occasion, the black display voltage VA, with which a sufficiently high vertical electric field can be generated between the transparent counter electrode 4 and the comb-shaped electrodes 5, is set in consideration of the polarity in white display of the lateral electric field between the pixel electrode and the common electrode among the comb-shaped electrodes 5, as described above. Accordingly, black display can be always shown in the pixel peripheral regions corresponding to the transparent counter electrodes 4 provided to the transparent substrate 22, without depending on the display state of the pixel main region other than the pixel peripheral regions.

As shown in FIG. 2B, accordingly, a black display region 23b in which black display is shown by the transparent counter electrode 4 as well as the light-shielding film 27S is set as the light shielding portion 24 in 3-dimensional display. This substantially reduces the lateral (horizontal) pixel aperture width in the lateral direction, whereby excellent display characteristics with small crosstalk can be achieved in 3-dimensional image display.

Meanwhile, the pixel peripheral region controller 61 does not perform voltage setting with the control voltage V61 in display of a single image (first format image), that is, while the parallax barrier panel 30 is entirely shielded from the light but sets a voltage such that multiple transparent counter electrodes 4 of the transparent counter electrode group 104 are all floating. Accordingly, the display panel 20 has a substantially equivalent structure to the structure in which the transparent counter electrodes 4 are not provided.

As a result, as shown in FIGS. 3A and 3B, a vertical electric field is not generated by the transparent counter electrode 4 and the comb-shaped electrodes 5, whereby the display (brightness) in the pixel peripheral region corresponding to the transparent counter electrode 4 is identical to the display (brightness) in the pixel main region. In other words, as well as the pixel main region, the contents of the display in the pixel peripheral region can be determined by the lateral electric field between the pixel electrode and the common electrode. As shown in FIG. 3A, accordingly, in the display pixel screen 11, an image display region 12B obtained by widening the image display region 12A toward the left and right by an amount of extended image display regions 12x in the pixel peripheral region is formed, and a black display region 13B that is narrowed in the left and right by the amount of the extended image display regions 12x is formed.

As described above, the pixel peripheral regions (extended image display regions 12x) contribute to the aperture together with the pixel main region (image display region 12A), improving the transmittance of each pixel, so that excellent display characteristics without a decrease in brightness can be achieved.

The black display region 13B in FIGS. 3A and 3B is a region that needs to be shielded from the light also in 2-dimensional display, where, specifically, a light leak near interconnections is prevented and a thin film transistor is shielded from the light. In this preferred embodiment, the light-shielding film 27S such as a low-reflection metal film or a carbon dispersed resin is formed on the transparent substrate 22 in a region corresponding to the black display region 13B. The color material film 27C is formed in the color filter layer 27 in which the light-shielding film 27S is not formed.

As described above, in the display panel 20 of the auto-stereoscopic image display device 10 according to the first preferred embodiment, the brightness setting process is performed by a pixel-peripheral-region brightness control unit composed of the multiple transparent counter electrodes 4 and the pixel peripheral region controller 61. This unit enables to variably control the brightness (presence or absence of black display) of the pixel peripheral regions of multiple pixels in accordance with the display mode (two-image display or single image display) after the completion of the auto-stereoscopic image display device 10.

In other words, image display with light shielding property enhanced in the horizontal direction (lateral direction) by forcibly setting the respective pixel peripheral regions of multiple pixels to the black display state can be performed in two-image display of the display panel 20. Meanwhile, image display with enhanced brightness by setting the brightness in the respective pixel peripheral regions of multiple pixels to the same brightness as that of the pixel main region can be performed in single image display of the display panel 20.

In this case, image display can be performed on the display panel 20 being a liquid crystal display panel such that in two-image display, image display with enhanced light shielding property in the horizontal direction is performed by generating an electric field in the liquid crystal layer 33 between the multiple transparent counter electrodes 4 and the comb-shaped electrodes 5 to forcibly set the pixel peripheral regions to the black display state and such that in single image display, image display with enhanced brightness is performed by causing the pixel peripheral region to contain the same contents of the display as those in the pixel main region.

As described above, the auto-stereoscopic image display device 10 according to the first preferred embodiment is characterized in that the transparent counter electrodes 4 and the pixel peripheral region controller 61 are provided in the display panel 20, and thus, the other configuration and operation thereof are similar to those of an auto-stereoscopic image display device of a typical visual field barrier type. For example, the display panel 20 and the parallax barrier panel 30 are driven similarly to the auto-stereoscopic image display device disclosed in, for example, Japanese Patent No. 2857429.

(Extension to Other Configuration)

The parallax barrier panel 30 is provided behind the display panel 20 in the first preferred embodiment, which may be provided in front of the display panel 20. The provision of the parallax barrier panel 30 in front of the display panel 20 allows the use of self-luminous display panels, such as an organic EL panel and plasma display as the display panel 20. In a case where a self-luminous display panel is used as the display panel 20, light-emitting in only the pixel peripheral region is controlled independently, whereby similar effects to those described in the first preferred embodiment can be achieved.

The case in which not stripes but a staggered pattern (staggered shape) is applied as the pattern shape of the parallax barrier is considered here. In this case, the pixels adjacent to the top and bottom and left and right of the sub-pixel region for right eye 23R (for left eye 23L) are the sub-pixel regions for left eye 23L (for right eye 23R), and thus, in display of a 3-dimensional image, the existence of the both lights of two images need to be removed in the up-down and left-right directions. For this reason, the pixel aperture width needs to be reduced in the longitudinal direction as well as the lateral direction.

In the case where not stripes but a staggered pattern is applied as the pattern shape of the parallax barrier, therefore, the transparent counter electrodes 4 are arranged such that the pixel aperture width in the up-down direction in the plan views of FIGS. 2A and 3A (depth direction in the cross-sectional views of FIGS. 2B and 3B), to thereby reduce crosstalk.

In other words, the structure as shown in FIG. 2B is also provided in the cross-section taken along C-C of FIG. 2A such that the transparent counter electrodes 4 which are not provided in a liquid crystal panel of a normal in-plane switching mode are formed correspondingly to the pixel peripheral regions being both end regions in the vertical direction (longitudinal direction) on the upper transparent substrate 22 side. This results in a further reduction in crosstalk.

While the transparent counter electrodes 4 are arranged on the liquid crystal layer 23 side with respect to the overcoat film 28 in the upper transparent substrate 22 of the display panel 20 of an in-plane switching mode in the first preferred embodiment, the transparent counter electrodes 4 may be arranged on the side opposite to the liquid crystal layer 23 with respect to the overcoat film 28. Although an electric field between the transparent counter electrodes 4 and the comb-shaped electrodes 5 required for liquid crystals to respond in the longitudinal direction needs to be increased in this arrangement, a 2-dimensional image is unlikely to be affected by the transparent counter electrodes 4 in display. This prevents a decrease in transmittance due to a slight amount of rising of the liquid crystal molecules 23e.

In this preferred embodiment, the in-plane switching mode is applied as the liquid crystal mode of the display panel 20. Alternatively, also in a case where the fringe field switching (FFS) mode is applied, through the formation of the electrodes equivalent to the transparent counter electrodes 4 on the transparent substrate 22 side, the lateral aperture width can be controlled by the pixel peripheral region controller 61 as in the in-plane switching mode.

When a liquid crystal mode is applied in which a vertical electric field between the pixel electrode (first electrode) and the counter electrode (second electrode) is used as in the TN mode and vertical alignment (VA) mode, the counter electrodes are divided such that the counter electrodes (equivalent to the transparent counter electrodes 4) for pixel peripheral regions and the counter electrodes for a pixel main region are driven independently. Then, as in the in-plane switching mode, with the pixel peripheral region controller 61 controlling the voltage state (including a floating state) with the control voltage V61, the pixel aperture width can be reduced such that black display appears in the pixel peripheral regions in 3-dimensional display.

Specifically, in the VA mode, black display appears (so-called normally black) in a case where no voltage is applied between the upper and lower electrodes (one is a pixel electrode and the other is a counter electrode for pixel peripheral region) that sandwich the liquid crystal layer 23 therebetween. Accordingly, in 3-dimensional display, control is made such that no voltage is applied between the upper and lower electrodes in the pixel peripheral region in order that black display may appear in the pixel peripheral region. In the TN mode, black display appears through application of a predetermined voltage (black display voltage) between the upper and lower electrodes (one is a pixel electrode and the other is a counter electrode for pixel peripheral region). Accordingly, in 3-dimensional display, control is made such that a black display voltage is applied between the upper and lower electrodes in the pixel peripheral region.

In 2-dimensional image display, meanwhile, control is made such that the voltage to be supplied to the counter electrode for the pixel peripheral region and the voltage to be supplied to the counter electrode for the pixel main region have the same voltage value.

The present invention is also applicable to the liquid crystal display panel adopting a liquid crystal mode in which a vertical electric field between a pixel electrode and a counter electrode is used as in the TN mode and VA mode, similarly to the in-plane switching mode.

As described above, the description has been given of the method in which in the TN mode and VA mode, the counter electrodes are divided and the counter electrodes (equivalent to the transparent counter electrodes 4) for pixel peripheral regions and the counter electrodes for a pixel main region are driven independently, so that black display appears in the pixel peripheral regions. Also in the in-plane switching mode, a drive system for the comb-shaped electrodes 5 may be divided and the comb-shaped electrodes 5 for pixel peripheral regions and the comb-shaped electrodes 5 for a pixel main region may be driven independently, so that a voltage between the pixel electrode and the common electrode in the comb-shaped electrodes 5 for pixel peripheral regions is set to almost zero in black display in the pixel peripheral region. This allows the application of an electric field in only the approximately vertical direction between the comb-shaped electrodes 5 and the transparent counter electrode group 104 in the pixel peripheral regions, whereby black display can be achieved ideally in the pixel peripheral regions irrespective of the state of the display potential in the pixel main region.

Second Preferred Embodiment

Liquid Crystal Display Device Capable of Adjusting Coloration of Color Display Even after Manufacturing of Panel FIGS. 5A and 5B are cross-sectional views showing a configuration of a display panel 50 according to a second preferred embodiment of the present invention. Similarly to the display panel 20 according to the first preferred embodiment, the display panel 50 according to the second preferred embodiment is a display panel that performs image display with multiple pixels arranged in matrix, where an in-plane switching mode is adopted as a liquid crystal mode.

As the structure characteristic of this preferred embodiment, transparent counter electrodes 44 are arranged in regions corresponding to pixel peripheral regions of a liquid crystal layer 53, on a transparent substrate 52 side of the respective pixels of a liquid crystal panel that performs color display with a color material film 57C of a color filter layer 57 for red, green, and blue (R, G, and B) being color components. In other words, the transparent counter electrodes 44 that are not provided in a liquid crystal panel of a normal in-plane switching mode are provided as in the first preferred embodiment. In the configuration shown in FIGS. 5A and 5B, the transparent counter electrodes 44 are formed below the transparent substrate 52 via the color filter layer 57 (light-shielding film 57S and color material film 57C (for RGB)) and an overcoat 58. Besides, comb-shaped electrodes 45 are provided on the lower transparent substrate 55 that is opposed to the transparent substrate 52 as in the first preferred embodiment, and a liquid crystal layer 53 is provided on the transparent substrate 55 including the comb-shaped electrodes 45.

FIG. 6 is an explanatory view schematically showing the contents of voltage control for multiple transparent counter electrodes 44 when a pixel peripheral region controller 62 performs the brightness setting process per color component. For the sake of description, a transparent counter electrode 44 for R (the color material film 57C is red), a transparent counter electrode 44 for G (the color material film 57C is green), and a transparent counter electrode 44 for B (the color material film 57C is blue) are represented as a transparent counter electrode 44R, transparent counter electrode 44G, and transparent counter electrode 44B, respectively. As shown in FIGS. 5A and 5B, the transparent counter electrode 44R, transparent counter electrode 44G, and transparent counter electrode 44B for R, G, and B are provided to each of multiple pixels arranged in matrix.

As shown in FIG. 6, the pixel peripheral region controller 62 supplies a control voltage V62R in common to the multiple transparent counter electrodes 44R forming a transparent counter electrode group 144R. Likewise, the pixel peripheral region controller 62 supplies a control voltage V62G in common to the multiple transparent counter electrodes 44G forming a transparent counter electrode group 144G, and supplies a control voltage V62B in common to the multiple transparent counter electrodes 44B forming a transparent counter electrode group 144B. It should be noted that the control voltages V62R, V62G, and V62B are supplied to the transparent counter electrode groups 144R, 144G, and 144B independently of one another.

The multiple transparent counter electrodes 44R are independently provided so as to control the liquid crystal molecules 53e in the corresponding pixel peripheral regions of pixels for R, the multiple transparent counter electrodes 44G are independently provided so as to control the liquid crystal molecules 53e in the corresponding pixel peripheral regions of pixels for G, and the multiple transparent counter electrodes 44B are independently provided so as to control the liquid crystal molecules 53e in the respectively corresponding pixel peripheral regions for pixels for B.

In a case where color adjustment is not required as to color display in RGB, namely in a case where color display is appropriately performed after manufacturing of the display device, the pixel peripheral region controller 62 causes the transparent counter electrodes 44 (all of 44R, 44G, and 44B) to be floating without supplying the control voltage V62. In other words, the pixel peripheral region controller 62 sets a state equivalent to that of the structure in which the display panel 50 does not include the transparent counter electrodes 44.

As a result, as shown in FIG. 5A, no vertical electric field is generated by the transparent counter electrodes 44 (all of 44R, 44G, and 44B), which enables the contents of the display (brightness) in the pixel peripheral regions corresponding to the transparent counter electrodes 44 to be identical to the contents of the display (brightness) in the pixel main region. In other words, the contents of the display in the pixel peripheral regions can be determined by the lateral electric field between a pixel electrode and a common electrode among the comb-shaped electrodes 45.

As described above, the pixel peripheral regions contribute to the aperture together with the pixel main region in all the RGB pixels, so that the color display characteristics in manufacturing can be kept as such.

Meanwhile, in a case where the color display needs to be adjusted by decreasing the brightness of any of R, G, and B from the brightness in manufacturing, the pixel peripheral region controller 62 supplies the control voltage V62 (at least one of V62R, V62G, and V62B) of the black display voltage VA to multiple transparent counter electrodes 44 (at least one of 44R, 44G, and 44B) of the transparent counter electrode group 144, which are targets to be decreased in brightness among the transparent counter electrode groups 144R, 144G, and 144B. The case in which the brightness for B is decreased is considered here.

In a case where B among R, G, and B requires color adjustment, the pixel peripheral region controller 62 supplies the control voltage V62B of the black display voltage VA that has been set in common to the transparent counter electrodes 44B of the transparent counter electrode group 144B. In consideration of the voltage setting state (voltage setting state of positive polarity or negative polarity) in white display of the comb-shaped electrodes 45 as in the first preferred embodiment, the black display voltage VA is variably set such that an electric field, which is capable of setting the light shielded state in which the liquid crystal molecules 53e located below the transparent counter electrodes 44 rise, is generated between the transparent counter electrode 44B and the comb-shaped electrodes 45. The timing at which the positive polarity or negative polarity is achieved may be controlled such that the control voltage V62B, which is a drive signal for supplying the black display voltage VA to the transparent counter electrode group 144B, is switched and varied in synchronization with the polarity switching of a drive signal having a voltage to be applied to the comb-shaped electrodes 45 for display.

Meanwhile, other color components R and G do not require color adjustment, and thus are not supplied with the control voltages V62R and V62G, so that the multiple transparent counter electrodes 44R and 44G are set to be floating.

As a result, as shown in FIG. 5B, in only B among R, G, and B, a vertical electric field is forced to occur between the transparent counter electrode 44B of the upper transparent substrate 52 and the comb-shaped electrodes 45 of the lower transparent substrate 55, so that the liquid crystal molecules 53e located below the transparent counter electrode 44B are caused to respond to rise. Accordingly, the brightness setting process per color component to selectively cause black display to appear in the pixel peripheral regions of the pixels for B can be performed.

On this occasion, the black display voltage VA, with which a high vertical electric field can be always generated between the transparent counter electrode 44B and the comb-shaped electrodes 45, is set in consideration of the polarity of the lateral electric field in white display between the pixel electrode and the common electrode, as described above. Accordingly, black display is always shown in the pixel peripheral regions corresponding to the transparent counter electrodes 44B provided to the transparent substrate 52, without depending on the display state of the pixel main region other than the pixel peripheral regions. Accordingly, the aperture ratio of the pixels for B is substantially reduced, and the brightness of the pixel for B is set lower than that in the completion of a device, which enables color adjustment regarding RGB color display.

As described above, in the display panel 50 of the display device according to the second preferred embodiment, the brightness setting process per color component is performed by the pixel-peripheral-region brightness control unit composed of the multiple transparent counter electrodes 44 (44R, 44G, and 44B) and the pixel peripheral region controller 62, whereby after the completion of the display device according to the second preferred embodiment, the brightness (presence or absence of black display) of the pixel peripheral regions of multiple pixels can be variably controlled for each of RGB color components, depending on the presence or absence of the need of color adjustment of RGB color display.

In other words, by performing the brightness setting process per color component described above, the display panel 50 of the display device according to the second preferred embodiment can perform color adjustment regarding the color display determined by RGB pixels through individual control of the brightness of each of the RGB color component pixels even after the completion of the device.

In this case, an electric field is generated in the liquid crystal layer 53 between the transparent counter electrode 44 and the comb-shaped electrodes 45 for a color component that requires color adjustment, to thereby force black display to appear in the pixel peripheral regions on a color component basis. This enables color adjustment after the completion of the device for the display panel 50 being a liquid crystal display panel.

The display device according to the second preferred embodiment is characterized in that the display panel 50 is capable of performing the brightness setting process per color component described above, which may be used in place of the display panel 20 of the auto-stereoscopic image display device 10 as in the first preferred embodiment or may be used as a display panel of a typical display device that displays only a single image.

(Extension to Other Configuration)

The transparent counter electrodes 44R, 44G, and 44B are each divided into more pieces so as to adjust an area (area of the pixel peripheral region) to which a voltage is applied. This enables to control the aperture ratio of each pixel for each of RGB color components at multiple stages and to set multiple types of contents of brightness decrease, so that the coloration of RGB color display can be adjusted finely.

<Others>

The parts to be processed through control by the pixel peripheral region controllers 61 and 62 shown in FIG. 4 can be executed by programming with, for example, a software-based CPU.

While the invention has been shown and described in detail, the foregoing description is in all aspects illustrative and not restrictive. It is therefore understood that numerous modifications and variations can be devised without departing from the scope of the invention.

What is claimed is:

1. A display device comprising: a display panel that performs image display with multiple pixels, each of said multiple pixels including at least one color component subpixel arranged in matrix; and a pixel-peripheral-region brightness control unit that controls, for each said color component subpixel, the brightness of a pixel peripheral region being a peripheral portion of each said color component subpixel, independently of a respective pixel main region other than said pixel peripheral region, wherein each of said multiple pixels includes multiple types of color component subpixels, and said pixel-peripheral-region brightness control unit performs a brightness setting process per color component to set, for each of said multiple types of color component subpixels, said multiple pixels to one of a first setting to forcibly set brightness of said pixel peripheral regions to a black display state and a second setting to set the brightness of said pixel peripheral regions to the same brightness as said pixel main region.

2. The display device according to claim 1, wherein
said display panel is a liquid crystal display panel in which said multiple pixels are formed by a liquid crystal layer whose state changes by an electric field to be formed between a first electrode and a second electrode, and
said pixel-peripheral-region brightness control unit includes:
multiple electrodes for pixel peripheral regions independently provided respectively corresponding to said pixel peripheral regions of said color component subpixels, said electrodes for multiple pixel peripheral regions having multiple types of electrodes for color component pixels respectively corresponding to said multiple types of color components, each of said multiple types of electrodes for color component subpixels being configured to generate an electric field in said liquid crystal layer between one of said first electrode and said second electrode and itself; and
a pixel peripheral region controller that sets, for each of said multiple types of electrodes for color component subpixels, states of voltages to be provided to said multiple electrodes for pixel peripheral regions to perform said brightness setting process per color component.

* * * * *